(No Model.)
I. N. KEELING.
VEHICLE BRAKE.
No. 558,282. Patented Apr. 14, 1896.
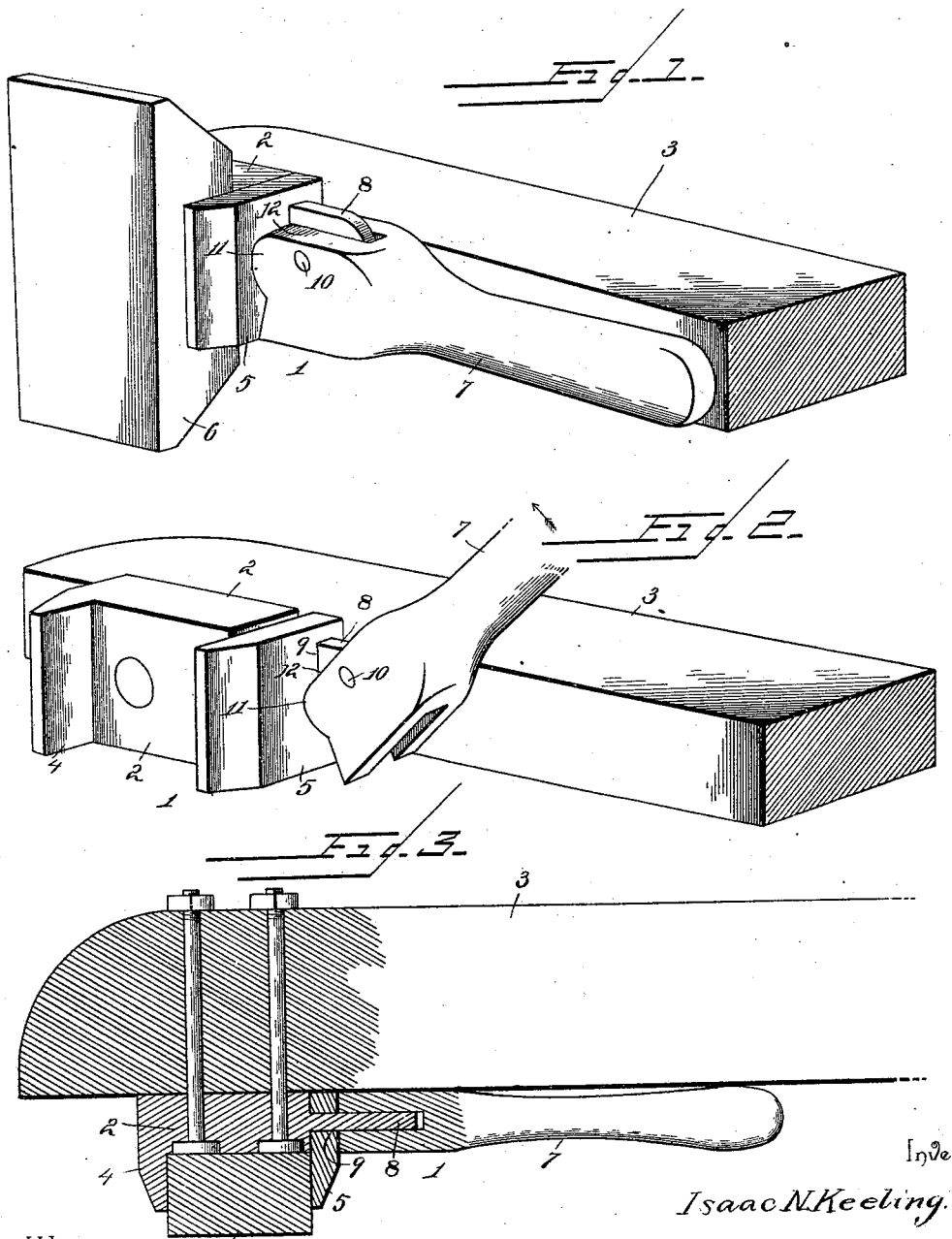
Witnesses
Thos. W. Riley
J. F. Riley
Inventor
Isaac N. Keeling.
By his Attorneys,
C. A. Snow & Co.

UNITED STATES PATENT OFFICE.

ISAAC NEWTON KEELING, OF TOMAHAWK, ARKANSAS.

VEHICLE-BRAKE.

SPECIFICATION forming part of Letters Patent No. 558,282, dated April 14, 1896.

Application filed May 21, 1895. Serial No. 550,118. (No model.)

*To all whom it may concern:*

Be it known that I, ISAAC NEWTON KEELING, a citizen of the United States, residing at Tomahawk, in the county of Searcy and State of Arkansas, have invented a new and useful Vehicle-Brake, of which the following is a specification.

The invention relates to improvements in vehicle-brakes.

The object of the present invention is to improve the construction of vehicle-brakes, more especially the means for attaching the brake-shoes to a brake bar, beam, or the like; to provide means whereby the brake-shoes of a vehicle may be readily removed when worn and new ones quickly secured in position, and to enable brake-shoes to be temporarily removed when it is desired to repair them or while a vehicle is traveling over a stretch of muddy road to prevent the wheels from clogging with mud and being retarded by the same.

The invention consists in the construction and novel combination and arrangement of parts hereinafter fully described, illustrated in the accompanying drawings, and pointed out in the claim hereto appended.

In the drawings, Figure 1 is a perspective view of a device constructed in accordance with this invention, and showing the manner of attaching a brake-shoe to a brake bar or beam. Fig. 2 is a similar view, the brake-shoe being removed. Fig. 3 is a horizontal sectional view, the parts being arranged as shown in Fig. 1.

Like numerals of reference indicate corresponding parts in all the figures of the drawings.

1 designates a brake-shoe-clamping device comprising a back 2, which is secured to a brake bar or beam 3, a stationary jaw 4, located at the outer side of the back 2, and a movable jaw 5, which is located at the inner side of the back 2 and which is held in engagement with a brake-block 6 by a lever 7. The back 2 of the clamping device is provided at its inner side with a vertically-disposed flange or tongue 8, arranged parallel with the adjacent face of the brake bar or beam 3, and fulcrumed on the tongue or flange 8 is the lever 7.

The movable jaw 5 and the stationary jaw 4 project outward from the back 2 and are adapted to receive between them the brake-block 6, and the movable jaw 5 is provided with an opening 9, receiving the tongue or flange 8, on which the movable jaw is adapted to slide.

The locking-lever 7 has its inner or pivoted end enlarged and bifurcated and secured to the tongue or flange 8 by a fastening device 10, forming the pivot or fulcrum, and the engaging end of the lever is bulged or enlarged at 11 to form a cam. The edge of the cam 11 is curved and is situated at a greater distance from the pivot 10 than the upper side edge 12 of the lever, whereby, when the latter is arranged vertically, the movable jaw will be released, and when swung downward in a horizontal position the movable jaw will be caused to clamp the brake-block. The engaging end of the lever is cut away slightly below the cam or curved edge 11 in order that the lever may swing slightly beyond the center to lock it, to prevent the brake-block from being released by the jolting of a vehicle.

The brake-block may be released or clamped by raising or lowering the lever 7, and it will be apparent that the clamping device is adapted to permit a brake-block to be readily detached when it is desired to repair the same or when passing over a stretch of muddy road to avoid clogging the wheels and retarding the vehicle. It will also be apparent that when the brake block or shoe becomes worn a new one may be readily mounted on the brake bar or beam.

Changes in the form, proportion, and the minor details of construction may be resorted to without departing from the principle or sacrificing any of the advantages of this invention, such as mounting the lever so as to swing downward in unlocking and arranging it to conform to the construction of any running-gear or brake mechanism.

What I claim is—

The combination with a brake-shoe, of a clamping device comprising a back provided at its inner side with a vertical flange or tongue, a stationary jaw located at the outer side of the back and rigid therewith and engaging the brake-shoe, a movable jaw engaging the inner side of the brake-shoe and provided with an opening receiving the said flange or tongue, and a locking-lever fulcrumed on the flange or tongue above its center and provided adjacent to its upper edge with a cam 11 and having a shoulder below the latter, said shoulder forming a stop, adapted to engage the movable jaw and maintaining the lever in substantially a horizontal position when the parts are locked, substantially as described.

In testimony that I claim the foregoing as my own I have hereto affixed my signature in the presence of two witnesses.

ISAAC NEWTON KEELING.

Witnesses:
J. M. STILL,
M. T. LOZZINS.